United States Patent
Hasegawa et al.

(10) Patent No.: US 6,336,513 B1
(45) Date of Patent: Jan. 8, 2002

(54) MULTI-AXLE VEHICLE WITH TWO HYDROSTATIC TRANSMISSIONS FOR DRIVING-STEERING

(75) Inventors: Toshiyuki Hasegawa; Koji Irikura; Hiroaki Shimizu, all of Amagasaki (JP)

(73) Assignee: Kanzaki Kokyukoki Mfg. Co., Ltd. (JP)

( * ) Notice: Subject to any disclaimer, the term of this patent is extended or adjusted under 35 U.S.C. 154(b) by 0 days.

(21) Appl. No.: 09/372,747

(22) Filed: Aug. 11, 1999

(30) Foreign Application Priority Data

Dec. 3, 1998 (JP) .......................................... 10-344319

(51) Int. Cl.[7] ................................................ B62D 6/00
(52) U.S. Cl. ...................................................... 180/6.2
(58) Field of Search ................................ 180/6.2, 6.44, 180/6.62, 6.66, 24.12

(56) References Cited

U.S. PATENT DOCUMENTS

| | | | | |
|---|---|---|---|---|
| 2,191,961 A | * | 2/1940 | Howell ....................... | 180/6.24 |
| 2,255,348 A | * | 9/1941 | Brown .................... | 18022/528 |
| 2,311,922 A | * | 2/1943 | Allin .......................... | 180/251 |

(List continued on next page.)

FOREIGN PATENT DOCUMENTS

| | | | | |
|---|---|---|---|---|
| DE | 4224887 A | * | 9/1993 | ................ 180/6.24 |
| EP | 0 806 337 A1 | | 11/1997 | |
| FR | 1 147 142 | | 10/1960 | |

(List continued on next page.)

OTHER PUBLICATIONS

Brochure Regarding Differential Steering, pp. 4–15.
Excel Industries, Inc. "Hustler 4000 Series", 1995, pp. 1–8.

(List continued on next page.)

*Primary Examiner*—Brian L. Johnson
*Assistant Examiner*—G. B. Klebe
(74) *Attorney, Agent, or Firm*—Sterne, Kessler, Goldstein & Fox P.L.L.C.

(57) ABSTRACT

A running vehicle comprises a steering operation tool, a pair of running-driving axles, a pair of running wheels drivingly connected with the pair of running-driving axles, a first differential unit interposed between the pair of running-driving axles, a first hydrostatic transmission for transmitting a driving force to the first differential unit, a pair of steering output shafts, a second differential unit interposed between the pair of steering output shafts, a second hydrostatic transmission for transmitting a driving force to the second differential unit. The second hydrostatic transmission drivingly interlocks with the steering operation tool so that the output speed and direction of the second hydraulic transmission is changed by manipulation of the steering operation tool. A first drive train is interposed between one of the steering output shafts and one of the running-driving axles, and a second drive train is interposed between the other steering output shaft and the other running-driving axle for transmitting the rotating effort to the other running-driving axle in the opposite direction to the first drive train. To improve the running efficiency on a rough road or soft ground, a pair of running-driven axles are disposed either in front of or in rear of the pair of running-driving axles, another pair of running wheels are drivingly connected with the pair of running-driven axles, and each of a pair of power transmission mechanisms is interposed between one of the running-driving axles and one of the running-driven axles arranged on each side of the vehicle, so as to rotate the pair of running-driven axles in the same rotational direction of the running driving axles. Otherwise, to reduce the turning radius, a pair of first steerable running wheels steered by manipulation of the steering operation tool are drivingly connected with the pair of running-driving axles. A pair of second steerable running wheels steered by manipulation of the steering operation tool, or castor wheels are disposed either in front of or in rear of the pair of first steerable running wheels.

23 Claims, 8 Drawing Sheets

U.S. PATENT DOCUMENTS

| | | | |
|---|---|---|---|
| 2,332,838 A | | 10/1943 | Borgward |
| 2,336,911 A | * | 12/1943 | Zimmermann ............... 180/6.2 |
| 2,336,912 A | | 12/1943 | Zimmerman |
| 2,391,735 A | | 12/1945 | Orshansky, Jr. |
| 2,763,164 A | | 9/1956 | Neklutin |
| 2,936,033 A | | 5/1960 | Gates |
| 3,371,734 A | | 3/1968 | Zaunberger et al. |
| 3,376,760 A | | 4/1968 | Gordainer |
| 3,395,671 A | | 8/1968 | Zimmerman, Jr. |
| 3,450,218 A | | 6/1969 | Looker |
| 3,492,891 A | | 2/1970 | Livezey |
| 3,530,741 A | | 9/1970 | Charest |
| 3,717,212 A | | 2/1973 | Potter |
| 3,901,339 A | * | 8/1975 | Williamson ................ 180/6.48 |
| 3,907,051 A | | 9/1975 | Weant et al. |
| 3,978,937 A | | 9/1976 | Chichester et al. |
| 4,174,762 A | * | 11/1979 | Hopkins et al. ........... 180/6.44 |
| 4,245,524 A | | 1/1981 | Dammon |
| 4,281,737 A | | 8/1981 | Molzahn |
| 4,399,882 A | | 8/1983 | O'Neill et al. |
| 4,471,669 A | | 9/1984 | Seaberg |
| 4,577,711 A | * | 3/1986 | Butler ....................... 180/24.1 |
| 4,718,508 A | * | 1/1988 | Tervola ..................... 180/6.44 |
| 4,729,257 A | | 3/1988 | Nelson |
| 4,732,053 A | * | 3/1988 | Gleasman et al. ........ 74/665 L |
| 4,738,328 A | | 4/1988 | Hayden |
| 4,776,235 A | | 10/1988 | Gleasman et al. |
| 4,776,236 A | | 10/1988 | Gleasman et al. |
| 4,782,650 A | | 11/1988 | Walker |
| 4,790,399 A | | 12/1988 | Middlesworth |
| 4,809,796 A | | 3/1989 | Yamaoka et al. |
| 4,813,506 A | | 3/1989 | Smith |
| 4,875,536 A | | 10/1989 | Saur et al. |
| 4,882,947 A | | 11/1989 | Barnard |
| 4,895,052 A | | 1/1990 | Gleasman et al. |
| 4,917,200 A | | 4/1990 | Lucius |
| 4,949,823 A | | 8/1990 | Coutant et al. |
| 5,004,060 A | | 4/1991 | Barbagli et al. |
| 5,015,221 A | | 5/1991 | Smith |
| 5,052,511 A | | 10/1991 | Hunt |
| 5,094,326 A | * | 3/1992 | Schemelin et al. ......... 192/363 |
| 5,131,483 A | | 7/1992 | Parkes |
| RE34,057 E | | 9/1992 | Middlesworth |
| 5,279,376 A | | 1/1994 | Yang et al. |
| 5,285,866 A | * | 2/1994 | Ackroyd ..................... 180/248 |
| 5,307,612 A | | 5/1994 | Tomiyama et al. |
| 5,339,631 A | | 8/1994 | Ohashi |
| 5,505,279 A | | 4/1996 | Louis et al. |
| 5,507,138 A | | 4/1996 | Wright et al. |
| 5,517,809 A | | 5/1996 | Rich |
| 5,535,840 A | | 7/1996 | Ishino et al. |
| 5,553,453 A | | 9/1996 | Coutant et al. |
| 5,560,447 A | | 10/1996 | Ishii et al. |
| 5,564,518 A | | 10/1996 | Ishii et al. |
| 5,644,903 A | | 7/1997 | Davis, Jr. |
| 5,649,606 A | | 7/1997 | Beberness et al. |
| 5,667,032 A | | 9/1997 | Kamlukin |
| 5,706,907 A | | 1/1998 | Unruh |
| 5,722,501 A | | 3/1998 | Finch et al. |
| 5,842,378 A | | 12/1998 | Zellmer |
| 5,850,886 A | | 12/1998 | Kuono et al. |
| 5,913,802 A | | 6/1999 | Mullet et al. |
| 5,946,894 A | | 9/1999 | Eavenson et al. |
| 5,975,224 A | * | 11/1999 | Satzler ...................... 180/6.44 |
| 5,997,425 A | | 12/1999 | Coutant et al. |
| 6,189,641 B1 | * | 2/2000 | Azuma ....................... 180/242 |
| 6,035,959 A | | 3/2000 | Schaedler |
| 6,038,840 A | | 3/2000 | Ishimori et al. |
| 6,126,564 A | | 10/2000 | Irikura et al. |
| 6,129,164 A | | 10/2000 | Teal et al. |

FOREIGN PATENT DOCUMENTS

| | | | | |
|---|---|---|---|---|
| GB | 2 303 829 | | 3/1997 | |
| JP | 63227476 | * | 9/1988 | ............... 180/6.2 |
| JP | 2-261952 | | 10/1990 | |
| JP | 6-264976 | | 9/1994 | |
| WO | WO 98/32645 | | 7/1998 | |
| WO | WO 00/01569 | | 1/2000 | |

OTHER PUBLICATIONS

Michael Bargo, Jr., "Tanks and dozers turn on a dime with new all gear steering", Popular Science, Jul. 1985, pp. 60–62.

R.M. Orgokiewicz, "Tank Steering Mechanisms", The Engineer, Mar. 3, 1967, pp. 337–340.

Excel Industries, Inc., "U–T–R The Ultimate Turning Radius", 1992, pp. 1–6.

Electric Tractor Corporation, "An Idea Whose Time Has Come", 5 pages, date of publication unknown, published in Ontario, Canada.

Electric Tractor Corporation, Model π9620, "The Ultimate Lawn and Garden Tractor", 6 pages, date of publication unknown.

FarmShow Magazine, "Battery Powered Riding mower", 1 page, date of publication, Mar.–Apr. 1996.

Deere & Company, "240, 245, 260, 265, 285 and 320 Lawn and Garden Tractors Technical Manual", front cover and pp. 10–2 to 10–4 and 10–6, date of publication, 1996.

U.S. Application No. 09/700,147, filed Nov. 13, 2000, entitled Driving Apparatus for Speed Changing and Steering of a Vehicle. (0666.1110000).

U.S. Application No. 09/700,923, filed Nov. 21, 2000, entitled Transmission for Speed Changing and Steering of a Vehicle. (0666.1150000).

U.S. Application No. 09/642,147, filed Aug. 21, 2000, entitled Axle Driving Apparatus. (0666.1340001).

U.S. Application No. 09/489,680, filed Jan. 24, 2000, entitled Vehicle Improved in Steering. (0666.1400000).

U.S. Appliaction No. 09/489,678, filed Jan. 24, 2000, entitled Integral Hydrostatic Transaxle Apparatus for Driving and Steering. (0666.1420000).

U.S. Appliaction No. 09/622,414, filed Aug. 16, 2000, entitled Integral–type Hydraulic and Mechanical Transaxle Apparatus for Driving and Steering a Vehicle. (0666.1520000).

Woods Equipment Company, "Woods Mow'n Machine, Zero turning radius riding mower", 12 pages, 1997.

ExMark "Professional turf care equipment", 20 pages, 1997.

Dixon Industries, Inc., "Dixon ZTR Riding Mowers", pp. 1–4, 1997.

Shivvers, Mfg., "Zero turn radius mower, The Commercial Clipper", pp. 1–4, 1997.

Ferris Industries, Inc., "The ProCut Z Zero Turn Rider", pp. 1–2, 1997.

Zipper, TS Mower, "The Zipper–TS Mowers", pp.1–2, 1997.

Westwood, "The Westwood Clipper, Owner's Instruction Manual", pp. 1–17, 19, date of publication unknown.

* cited by examiner ence between the capacities of the hydraulic pumps and motors, left or right turning feeling of the vehicle was different, resulting in that the running vehicle was very hard to steer.

MULTI-AXLE VEHICLE WITH TWO HYDROSTATIC TRANSMISSIONS FOR DRIVING-STEERING

BACKGROUND OF THE INVENTION

1. Field of the Invention

The present invention relates to a running vehicle having a pair of hydrostatic transmissions, each of which pair includes a hydraulic pump and a hydraulic motor fluidly connected with each other, one of which pair is used for steering and the other is for running-driving, so as to drive and steer the running vehicle by use of a steering operation tool.

2. Related Art

Conventionally, technology where a pair of hydrostatic transmissions (HSTs) are laterally connected, driving axles project laterally from respective HSTs, running-driving wheels are fixed to the outer ends of both axles, wherein movable swash plates as capacity adjusting members for the hydraulic pumps of the HSTs are individually changed in angle thereby driving the left and right running wheels individually, is well-known, as disclosed in, for example, U.S. Pat. No. 4,782,650.

In such constructions, running speeds of the left and right HSTs, when the vehicle is driven straight forward, are equalized, and, when turned, are different.

The above-said running vehicle, however, could not travel straight-forward unless the output rotations of the left and right HSTs completely coincided with each other, adjustments in shipment took much time, and parts and assembly errors had to be diminished so as to improve accuracy. Also, when there was a difference between the capacities of the hydraulic pumps and motors, left or right turning feeling of the vehicle was different, resulting in that the running vehicle was very hard to steer.

Also, the same running vehicle was larger in turning radius due to its lateral arrangement of the pair of HSTs, so that the vehicle had to run in the same place many times for such work as lawn-mowing around trees, thereby deteriorating the working efficiency.

Thus, for overcoming the above problems, a running vehicle including a steering operation tool; a pair of running-driving axles; a pair of running wheels drivingly connected with the pair of running-driving axles; a first differential unit interposed between the pair of running-driving axles; a first hydrostatic transmission for transmitting a driving force to the first differential unit; a pair of steering output shafts; a second differential unit interposed between the pair of steering output shafts; a second hydrostatic transmission for transmitting a driving force to the second differential unit; a first drive train interposed between one of the steering output shafts and one of the running-driving axles, and a second drive train interposed between the other steering output shaft and the other running-driving axle for transmitting the rotating effort to the other running-driving axle in the opposite direction to the first drive train, wherein the second hydrostatic transmission operationally interlocks with the steering operation tool so that the output speed and direction of the second hydraulic transmission is changed by manipulation of the steering operation tool, has come to be invented. The vehicle does not require such labor as above mentioned for precise coincidence between the capacities of the first and second hydrostatic pumps and motors. Also, when both the hydrostatic pumps and motors are arranged in a longitudinal line, the vehicle becomes laterally compact, thereby diminishing the turning radius.

However, it is still desirable to improve the running efficiency of the vehicle when it is driven on a rough road or a soft ground. Also, when such a running vehicle has a plurality of running wheels arranged in a longitudinal direction so as to be made larger in whole length, it is still difficult to diminish the turning radius of the vehicle only by changing the number of rotations of the left and right running-driving wheels.

SUMMARY OF THE INVENTION

An object of the present invention is to greatly improve a running efficiency of a running vehicle, when running on a rough road or a soft ground, which includes a steering operation tool; a pair of running-driving axles; a pair of running wheels drivingly connected with the pair of running-driving axles; a first differential unit interposed between the pair of running-driving axles; a first hydrostatic transmission for transmitting a driving force to the first differential unit; a pair of steering output shafts; a second differential unit interposed between the pair of steering output shafts; a second hydrostatic transmission for transmitting a driving force to the second differential unit; a first drive train interposed between one of the steering output shafts and one of the running-driving axles, and a second drive train interposed between the other steering output shaft and the other running-driving axle for transmitting the rotating effort to the other running-driving axle in the opposite direction to the first drive train, wherein the second hydrostatic transmission operationally interlocks with the steering operation tool so that the output speed and direction of the second hydraulic transmission is changed by manipulation of the steering operation tool.

To achieve the object, a pair of running-driven axles are disposed either in front or rear of the pair of running-driving axles, another pair of running wheels are drivingly connected with the pair of running-driven axles, and each of a pair of power transmission mechanisms is interposed between the running-driving axle and the running-driven axle arranged on each common side of the vehicle, so as to rotate the pair of running-driven axles in the same rotational direction of the running-driving axles.

Additionally, in order to further diminish the turning radius of the vehicle, the vehicle may be additionally provided with a pair of steerable running wheels which are steered by manipulation of the steering operation tool.

Another object of the present invention is to further diminish the turning radius of the above-said running vehicle comprising the pair of running-driving axles and wheels, the first and second differential units, the first and second hydrostatic transmissions, the pair of steering output shafts, the first and second drive trains, especially when the vehicle has a plurality of running wheels arranged in a longitudinal direction so as to be made larger in whole length.

To achieve the object, the running-driving wheels are made to be steered by manipulation of the steering operation tool, thereby serving as first steerable running wheels.

In this construction, a pair of second steerable running wheels, which are steered by manipulation of the steering operation tool, are disposed either in front or rear of the pair of first steerable running wheels. The pair of first steerable running wheels are steered either in the same steering direction with or in the opposite steering direction to the second steerable running wheels steered by the manipulation of the steering operation tool. They may be steered selectively either in the same steering direction with or in the opposite steering direction to the second steerable running wheels steered by manipulation of the steering operation tool.

Furthermore, a pair of running-driven axles may be disposed either in front or rear of the pair of running-driving axles, so that the pair of running-driven axles are driven in synchronism with the pair of running-driving axles, and another pair of running wheels may be drivingly connected with the pair of running-driven axles. The running-driven axles may be driven through a pair of power transmission mechanisms, each of which is interposed between the running-driving axle and the running-driven axle arranged on each common side of the vehicle, so as to rotate the pair of running-driven axles in the same rotational direction of said running-driving axles. Alternatively, a third differential unit may be interposed between the pair of running-driven axles, so that the third differential unit receives a driving force taken out from the first hydrostatic transmission. Additionally, the pair of running wheels drivingly connected with the pair of running-driven axles may be steerable so as to be steered by manipulation of the steering operation tool.

Alternatively, in addition to the first steerable running wheels, at least one castor wheel may be disposed either in front or rear of said pair of first steerable running, wheels. Additionally, similar second steerable running wheels or similar running-driven axles may be provided.

These and other objects of the invention will become more apparent in the detailed description and examples which follow.

DETAILED DESCRIPTION OF THE PREFERRED EMBODIMENTS

An axle driving/steering unit 10 for the present invention can make its left and right running-driving wheels different in their rotary speeds so as to turn a vehicle using it. It comprises a first running hydrostatic transmission (to be herein after called "a main driving HST") 21 having a hydraulic pump and motor fluidly connected with each other, a second steering hydrostatic transmission (to be herein after called "a steering HST") 22 having a hydraulic pump and motor fluidly connected with each other, a steering differential unit (a second differential unit) 23 for steering the vehicle, and a running differential unit (first differential unit) 24 for running-driving the vehicle. Differential units 23 and 24 are either of a type of a combination of planetary gears and bevel gears or of a type of a combination of a pair of differential gears.

Figure 1:
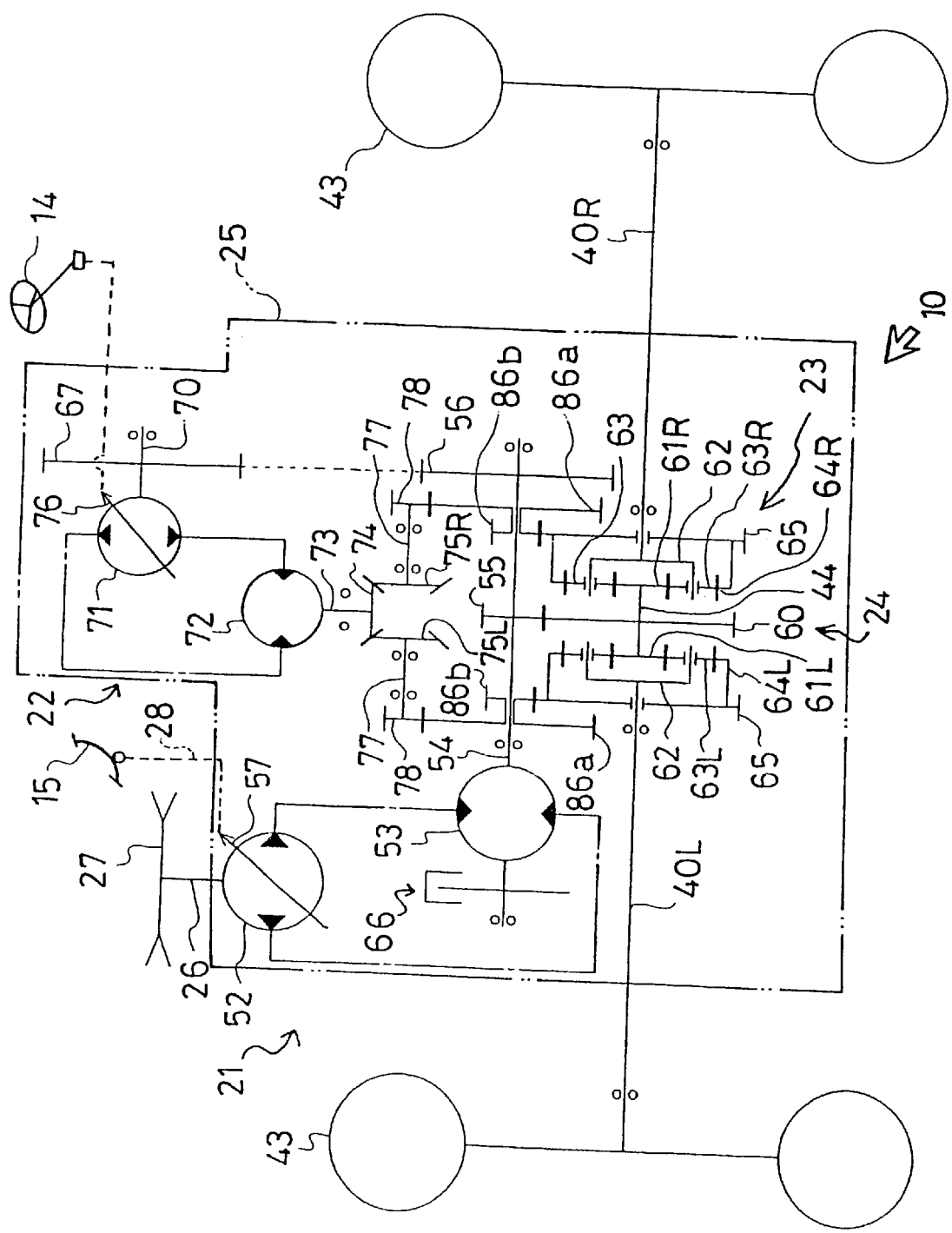
FIG. 1 is a schematic diagram of an axle driving/steering unit of the present invention.

Referring to FIG. 1 showing axle driving/steering unit 10 using planetary gears and bevel gears, main driving HST 21 comprises a variable displacement hydraulic pump 52 and a fixed displacement hydraulic motor 53, as is well-known. An input shaft 26 as a pump shaft of hydraulic pump 52 projects from a housing 25 and a driving force is transmitted from an engine 11 through a belt 30 to an input pulley 27 provided on input shaft 26 (refer to FIG. 3).

Hydraulic pump 52 and hydraulic motor 53 are fluidly connected with each other by a closed circuit formed in a center section.

A movable swash plate 57, used as means for changing a discharge amount and a discharge direction of operating oil from hydraulic pump 52, is connected with a control shaft. The control shaft is connected through connecting means 28 like an arm or a link disposed outside housing 25 with a speed adjusting member like a lever or a pedal (in this embodiment, a speed change pedal 15) provided on a running vehicle. Speed change pedal 15 is pivotally supported at the center thereof onto the vehicle body. When pedal 15 is trod at the front portion, the vehicle runs forwardly and is accelerated in proportion to its treading amount. When trod at the rear portion, the vehicle is driven rearwardly.

Speed change pedal 15 is turned to tilt movable swash plate 57, thereby enabling the discharge direction and discharge amount of operating oil from hydraulic pump 52 to be changed and the running speed to be changed.

Pressure oil from hydraulic pump 52 is sent to hydraulic motor 53 through an oil passage in the center section so as to drive a motor shaft 54. A braking unit 66 is disposed on one side of motor shaft 54, which is an output shaft of hydraulic motor 53. Onto the other side are fixed a running-driving gear 55 and a steering power take-off gear 56. Running-driving gear 55 engages with a center gear 60 fixed onto a shaft 44 disposed between driving axles 40L and 40R and coaxial therewith. On both sides of shaft 44 are fixed sun gears 61L and 61R, which engage at the outer peripheries thereof with planetary gears 63L, and 63R pivotally supported onto carriers 62 fixed to the inner ends of running-driving axles 40L and 40R. Internal gears 64L and 64R engage with planetary gears 63 around sun gears 61L and 61R. Large diameter gears 65 integrally fixed with internal gears 64L, and 64R are freely fitted onto running-driving shafts 40L, and 40R outside carriers 62. Thus, running differential unit 24 of a running-driving system is constructed.

Steering power take-off gear 56 engages with an input gear 67 for steering HST 22. Input gear 67 is fixed on an input shaft 70 serving as a pump shaft for a hydraulic pump 71 of steering HST 22. Steering HST 22 comprises a variable displacement hydraulic pump 71 and a fixed displacement hydraulic motor 72 and is mounted onto the center section fixed into housing 25. Both pump 71 and motor 72 are fluidly connected through oil passages in the center section. A movable swash plate 76 of hydraulic pump 71 is interlockingly connected through an arm 139 and a connection link 160 (refer to FIG. 3) with a steering wheel 14 serving as a steering operation tool provided on the vehicle, and tilts correspondingly to a rotation of steering wheel 14. Movable swash plate 76 tilts to change the discharge direction and discharge amount of pressure oil from hydraulic pump 71 so as to enable motor shaft 73 of hydraulic motor 72 to be changed in the direction and number of rotations thereof.

A bevel gear 74 is fixed at the upper end of motor shaft 73 of hydraulic motor 72. A pair of side bevel gears 75L and 75R, disposed in opposite to each other, engage with bevel gear 74 so as to be rotated reversely to each other. Small diameter gears 78 are fixed onto the outer ends of a pair of steering output shafts 77 on which side bevel gears 75L and 75R are fixedly supported, and engage with large diameter gears 86a of twin gears 86 free-fitted onto motor shaft 54. Small diameter gears 86b of twin gears 86 engage with large diameter gears 65, respectively, so as to transmit the driving force to steering differential unit 23.

In the above-mentioned construction, input shaft 26 is always driven in the state that engine 11 is driven. When steering wheel 14 is put in the straight forward running direction, steering HST 22 is in neutral and motor shaft 73 of hydraulic motor 72 is not driven, so that speed change pedal 15 is trod at the front or the rear to turn movable swash plate 57 for hydraulic pump 52 of main driving HST 21, thereby driving hydraulic motor 53, whereby left and right running-driving axles 40L and 40R are driven in an equal number of rotations through motor shaft 54, running-driving gear 55, center gear 60 and running-differential unit 24, and the vehicle is straight forwardly or rearwardly driven. In the state of forwardly or rearwardly driving, hydraulic pump 71 of steering HST 22 is driven from motor shaft 54 through gears 56 and 67 in proportion to the running speed, thereby enabling the steering feeling corresponding thereto to be obtained by the operation as described later.

When steering wheel 14 is rotated in the straight forward running state, movable swash plate 76 of steering HST 22 is turned to drive hydraulic motor 72. For example, when steering wheel 14 is rightwardly turned, hydraulic pump 71 is actuated so as to drive hydraulic motor 72, so that the driving force from motor shaft 73 is transmitted to left and right side bevel gears 75l, and 75R through bevel gear 74 in a manner that one of side bevel gears 75L and 75R is normally rotated and the other is reversely rotated in an equal numbers of rotations, and furthermore the driving force is transmitted to internal gears 64L and 64R through small diameter gears 78 and twin gears 86. She speed of normal rotation of internal gear 64L is added to that of normal revolution of planetary gears 63L normally rotating around sun gear 61L and the speed of reverse rotation of internal gear 64R is deducted from that of normal revolution of planetary gears 63R around sun gear 61R.

Thus, keeping the driving state of both running-driving axles 40L and 40R, the number of rotations of driving axle 40L, becomes larger than that of driving axle 40R, thereby rightwardly turning the direction of the vehicle.

A discharge amount of oil from hydraulic pump 71 increases accordingly as the turning angle of steering wheel 14 becomes larger, and correspondingly, the rotary speed of hydraulic motor 72 increases in a stepless manner, so that a difference of rotary speeds between left and right running-driving axles 40L and 40R gradually increases, thereby enabling the vehicle to be turned further in a smaller radius.

Conversely, when steering wheel 14 is leftwardly turned, movable swash plate 76 of steering HST 22 is tilted in the reverse direction to the above-mentioned, whereby the output rotation direction of hydraulic motor 72 becomes reversed so as to leftwardly turn the vehicle in the reverse direction to the above-mentioned case.

In a case when speed change pedal 15 is trod at the rear to rearwardly drive the vehicle, speed change pedal 15 is rearwardly turned to turn movable swash plate 57 reversely to the above-mentioned so as to rotate motor shaft 54 reversely to its rotational direction for forward movement, thereby driving the vehicle rearward. In the case of rearwardly running of the vehicle, when steering wheel 14 is rightwardly rotated to tilt movable swash plate 76, hydraulic motor 72 and motor shaft 73 are rotated reversely to their rotational direction in the same case when the vehicle runs forwardly because of the reverse rotation of input shaft 70 of steering hydraulic pump 71. Thus, left side bevel gear 75L is rotated reversely so that its rotary speed is added to the speed of the reverse revolution of left planetary gears 63L, and right side bevel gear 75R is rotated normally so that its rotary speed is deducted from the speed of the reverse revolution of right planetary gears 63R, whereby the vehicle can rightwardly turn while rearwardly moving. Conversely, the vehicle, while rearwardly moving, can be turned leftwardly by rotating the steering wheel 14 leftward.

Accordingly, the vehicle, even when rearwardly driven, can turn corresponding to the rotating direction of steering wheel 14 so as to be driven in the same feeling as an automobile. When speed change pedal 15 is in a neutral position, i.e., when the vehicle stops, hydraulic motor 53 is not driven, whereby steering hydraulic pump 71 is not driven, so that, even when steering wheel 14 is rotated, hydraulic motor 72 is not driven and the vehicle does not travel. Hence, even when the operator who gets in and out of a driver's seat in the vehicle touches steering wheel 14, the vehicle is stationary, thereby ensuring safety.

Figure 2:
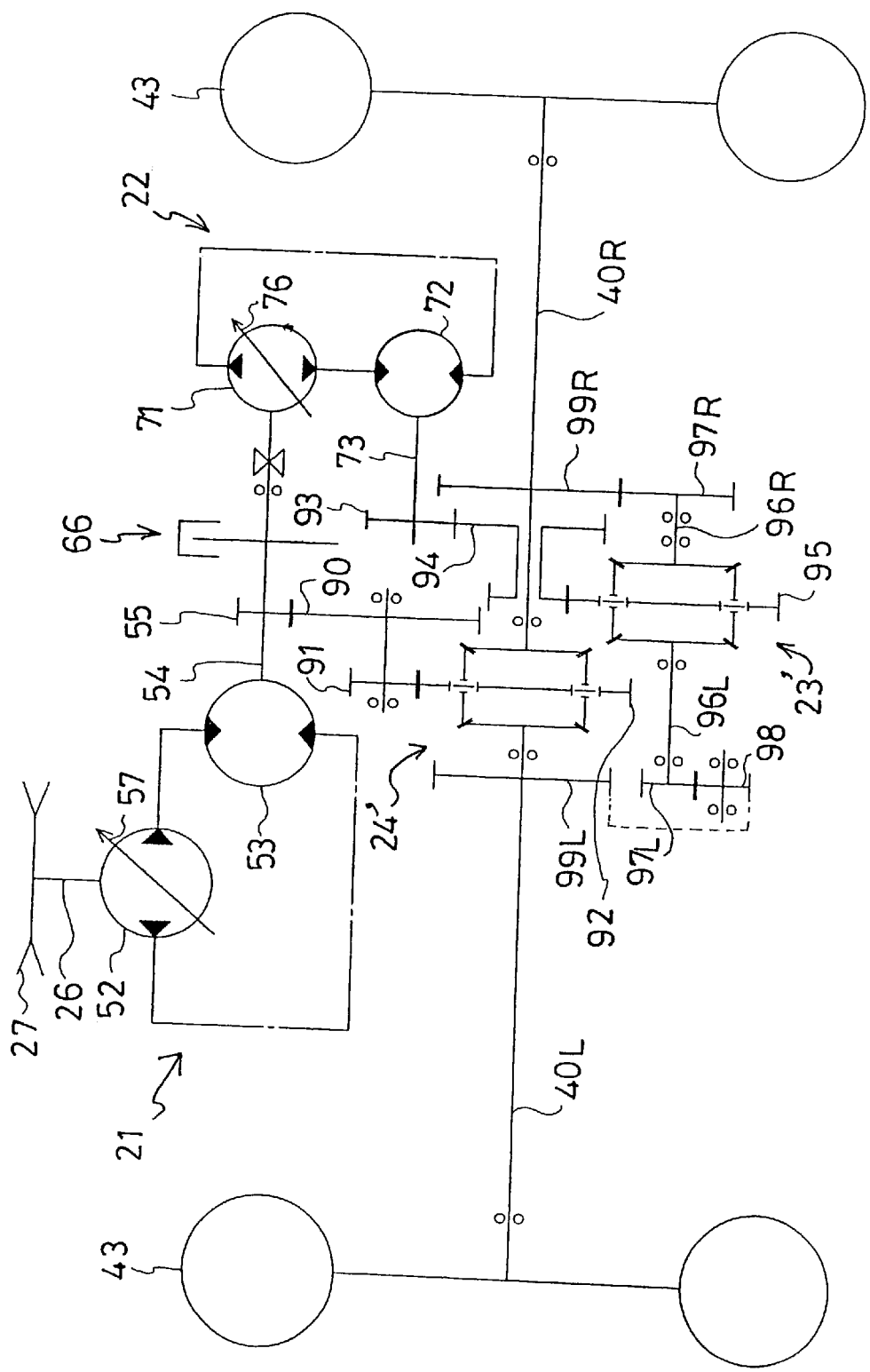
FIG. 2 is a schematic diagram showing a modified embodiment of the axle driving/steering unit of FIG. 1.

The steering differential unit and the running differential unit may, as shown in FIG. 2, comprise both the differential gears. In this case, the input shaft of steering HST 22 is directly connected onto motor shaft 54 of main driving HST 21, and running-driving gear 55 fixed onto motor shaft 54 transmits the driving force to differential ring gear 92 of running differential unit 24' through gears 90 and 91. On motor shaft 73 of steering FIST 22 is fixed a spur gear 93, from which the driving force is transmitted to differential ring gear 95 of a steering differential unit 23' through twin gears 94 fitted on right running-driving axle 40R. On the one hand, the driving force is transmitted through a reversing gear 98 from a left differential output gear 97L, fixed onto left steering output shaft 96L of steering differential unit 23' to a gear 99L fixed onto left running-driving axle 40L, and on the other hand, the driving force is transmitted from a right differential output gear 97R fixed onto a right steering output shaft 96R of steering differential unit 23' to a gear 99R fixed onto right running-driving axle 40R.

Thus, as above-mentioned, when steering wheel 14 is rightwardly turned, the normal rotational driving force is transmitted to left gear 99L, and when steering wheel 14 is leftwardly turned, the normal rotational driving force is transmitted to right gear 99R.

However, it is possible to transmit the driving force by sprockets and chains instead of gears 97L, 97R and 99L, 99R. Also, it is possible that main driving HST 21 and running differential unit 24' are housed in one housing so as to be interlockingly connected, steering HST 22 and steering differential unit 23 are housed in another housing so as to be interlockingly connected, and the output rotation from steering differential unit 23' is laterally and reversely transmitted to the output shafts (driving axles 40L and 40R) of running differential unit 24.

To further reduce the turning radius of a vehicle including running-driving wheels which can be differentially driven by axle driving/steering system 10 interlocked with the steering operation tool (steering wheel 14), at least one castor wheel may be additionally provided for the vehicle. However, the castor wheel is hard to be viewed by the operator because it is disposed under a floor of the vehicle, and the castor wheel is independent of steering wheel 14, whereby, in the state where the vehicle stops, it is difficult to distinguish which direction the castor wheels are in.

For example, in a case when the castor wheel stops while leftwardly turning, then the vehicle starts while steering wheel 14 is rightwardly turned, the castor wheels may instantaneously be turned from the left side to the right side, whereby the vehicle, for a moment, moves in the direction of a letter S, resulting in the operator being misguided.

When the vehicle parks on a slope along the contour line thereof, vehicle weight acts to turn the castor wheels in the tilting direction, whereby the vehicle body tilts down forwardly.

In order to solve the above-mentioned problem, the present invention applies axle driving/steering unit 10 to a multi-wheeled vehicle of four or more wheels.

Figure 3:
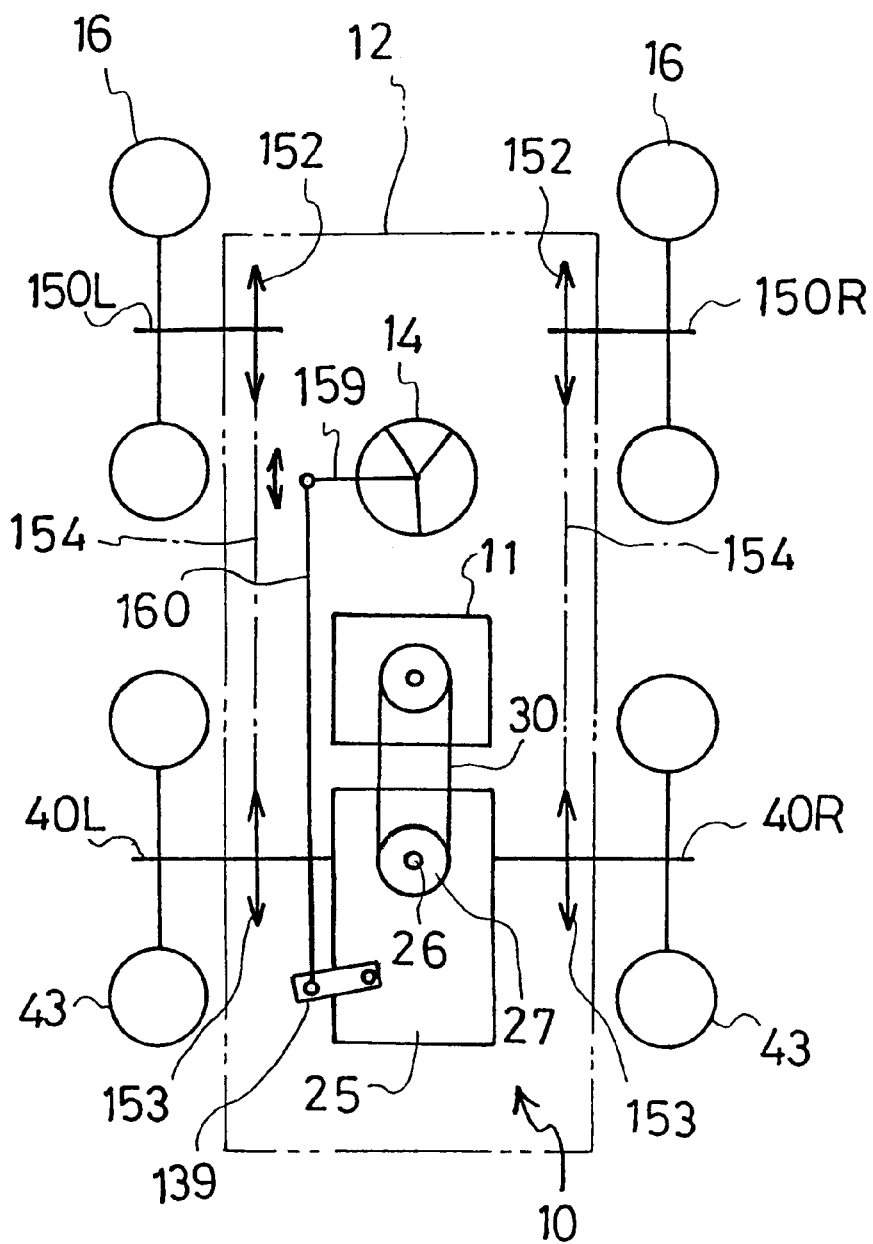
FIG. 3 is a schematic view of a running vehicle having the axle driving/steering unit according to the present invention.

In the first embodiment as shown in FIG. 3, a plurality (one pair in this embodiment) of running-driven axles 150L and 150R are rotatably connected to a vehicle chassis 12 and extend in parallel to left and right running-driving axles 40L and 40R. Sprockets (or pulleys) 152 are fixed onto running-driven axles 150L and 150R, and sprockets 153 are fixed onto running-driving axles 40L and 40R, respectively, and a chain (or a belt) 154 is interposed between each sprocket 152 and each sprocket 153 disposed front and rear on the same side of the vehicle, so as to drive running-driven axles 150L and 150R in the same direction and at the same rotary speed with running-driving axles 40L and 40R. Front running wheels 16 are fixed onto running-driven axles 150L and 150R, and rear running wheels 43 onto running-driving axles 40L and 40R.

In such a construction, a plurality of left and right running wheels (four wheels in this embodiment) are simultaneously driven in the same direction and in an equal number of rotations while running straight forward. The runningdriving wheel (rear ruining wheel 43) and the runningdriven wheel (front running wheel 16) toward which steering wheel 14 is rotated (a turning side of the vehicle), when turned, decreases in the number of rotations, and those at the other turning side increase so as to turn the vehicle. Since all the running wheels are driven during straight running and also when turning, the vehicle can effectively run on rough or soft ground, whereby the construction of the invention can be applied to, for example, a skid steering loader, a carrier or an amphibian vehicle.

In addition, steering wheel 14 is connected to movable swash plate 76 of steering HST 22 through a gear in a steering gear box (not shown), a pitman arm 159, and connection link 160. In the gear box are housed reduction gears of conventional rack-and-pinion type or worm gear type, for converting the rotational motion of steering wheel 14 into linear motion of pitman arm 159. Hence, the posture of front running wheels 16, which are different from the above said castor wheel, is always maintained unless steering wheel 14 is manipulated.

Figure 4:
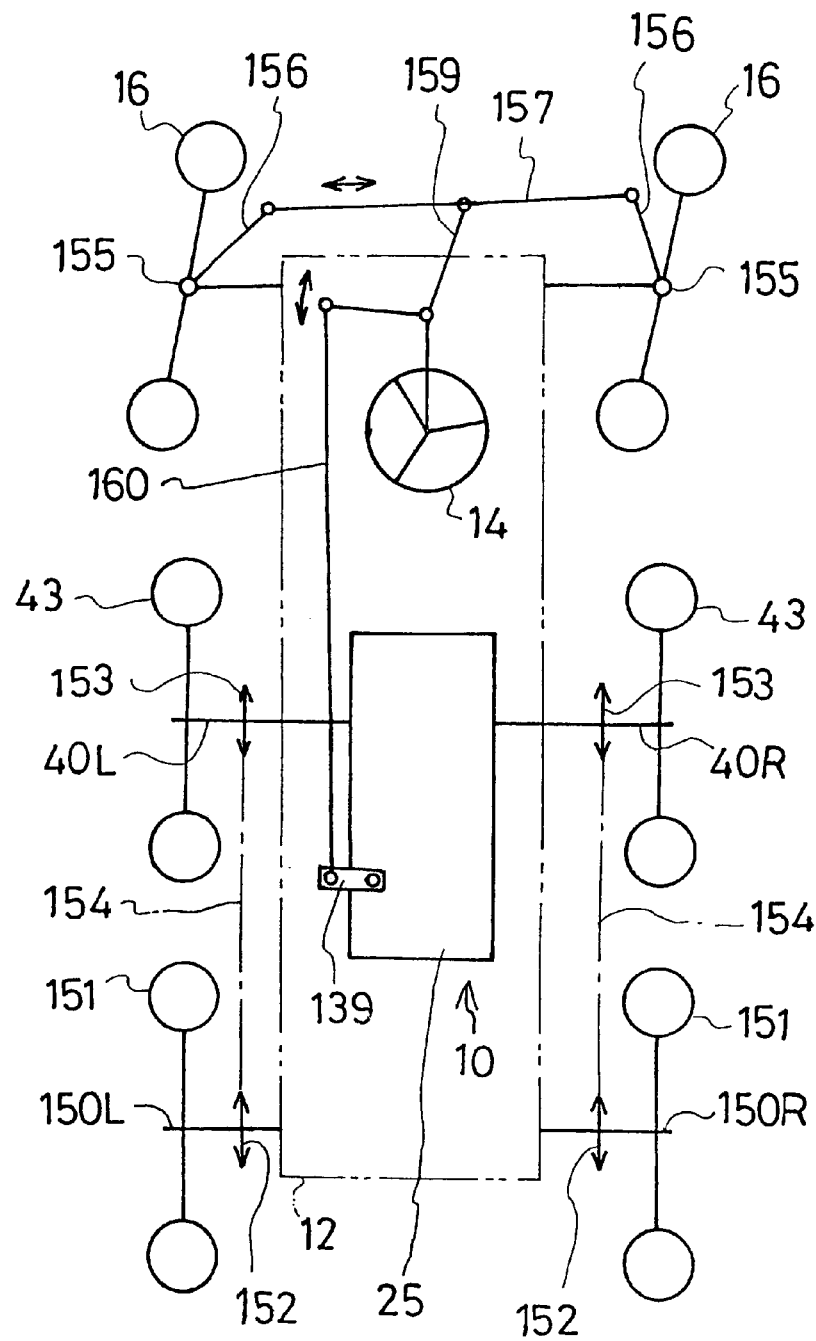
FIG. 4 is a schematic view of a second embodiment of the running vehicle of FIG. 3.

Next, an explanation will be given on a second embodiment of a running vehicle driven by axle driving/steering unit 10 in accordance with FIG. 4, in which a plurality (one pair in this embodiment) of running-driven axles 150L and 150R are rotatably supported onto vehicle chassis 12 in parallel to and behind (or before) running-driving axles 40L and 40R, and can laterally and separately be driven through sprockets (pulleys) 152 and 153 and chains (belts) 154, the same as the first embodiment. Running-driven wheels 151 are fixed onto running-driven axles 150L and 150R, respectively.

Front running wheels 16 serving as the steerable running wheels are supported to king pins 155 in vehicle chassis 12 in front of axle driving/steering unit 10, knuckle arms 156 are fixed to king pins 155, and left and right knuckle arms 156 are pivotally connected with each other through a tie rod 157. Tie rod 157 is connected to one end of a pitman arm 159, and the other end thereof is interlockingly connected with a stem of steering wheel 14 through a gear. In addition, knuckle arms 156 and tie rod 157, when steering wheel 14 is fully turned, tilt at about 80° in this embodiment and in the direction of turning front running wheels 16. Steering wheel 14 is connected through pitman arm 159 and connection link 160 with arm 139 for rotating movable swash plate 76 of steering HST 22.

Thus, in such the construction, steering wheel 14 is rotated to turn steerable front running wheels 16 in the lateral turning direction, and the rotary speed of rear running wheels 43 serving as running-driving wheels, and running driven wheels 151 on one side is made different from that on the other side, so as to turn the vehicle body, whereby the turning radius can be diminished. Accordingly, even when a whole length of vehicle body is made larger, the vehicle can smoothly make a small turn. Also, the wheels scarcely cause dragging while the vehicle is turning, thereby enabling the vehicle to turn without roughening a field.

Next, an explanation will be given on a third embodiment of a running vehicle driven by axle driving/steering unit 10 in accordance with FIG. 5. In this embodiment, rear running wheels 43 serving as running-driving wheels can be steered by manipulation of steering wheel 14 in the same turning direction of front steerable running wheels 16. In brief, front running wheels 16 are to be steered and rear running wheels 43 are to drive and to be steered. Additionally, steerable running-driven wheels 151 may be provided.

Rear running wheels 43 are supported onto king pins 163 rotatably supported on vehicle chassis 12. Knuckle arms 164 are fixed to king pins 163 and pivotally connected with each other through a tie rod 165. Tie rod 165 is connected to pitman arm 159 through a bell crank arm 167 and a connecting link 166. Pitman arm 159 is connected through connecting link 160 with arm 139 for rotating movable swash plate 76 of steering HST 22.

According to such construction, in addition to the difference between the rotary speeds of left and right rear running wheels 43 driven by axle driving/steering unit 10, the laterally rotational direction of front running wheels 16 and that of rear running wheels 43 coincide with each other, so that all front and rear running wheels 16 and 43 can be moved substantially in parallel, whereby the road or field is prevented from being roughened, the turning radius can be diminished and side slip can be prevented.

Figure 5:
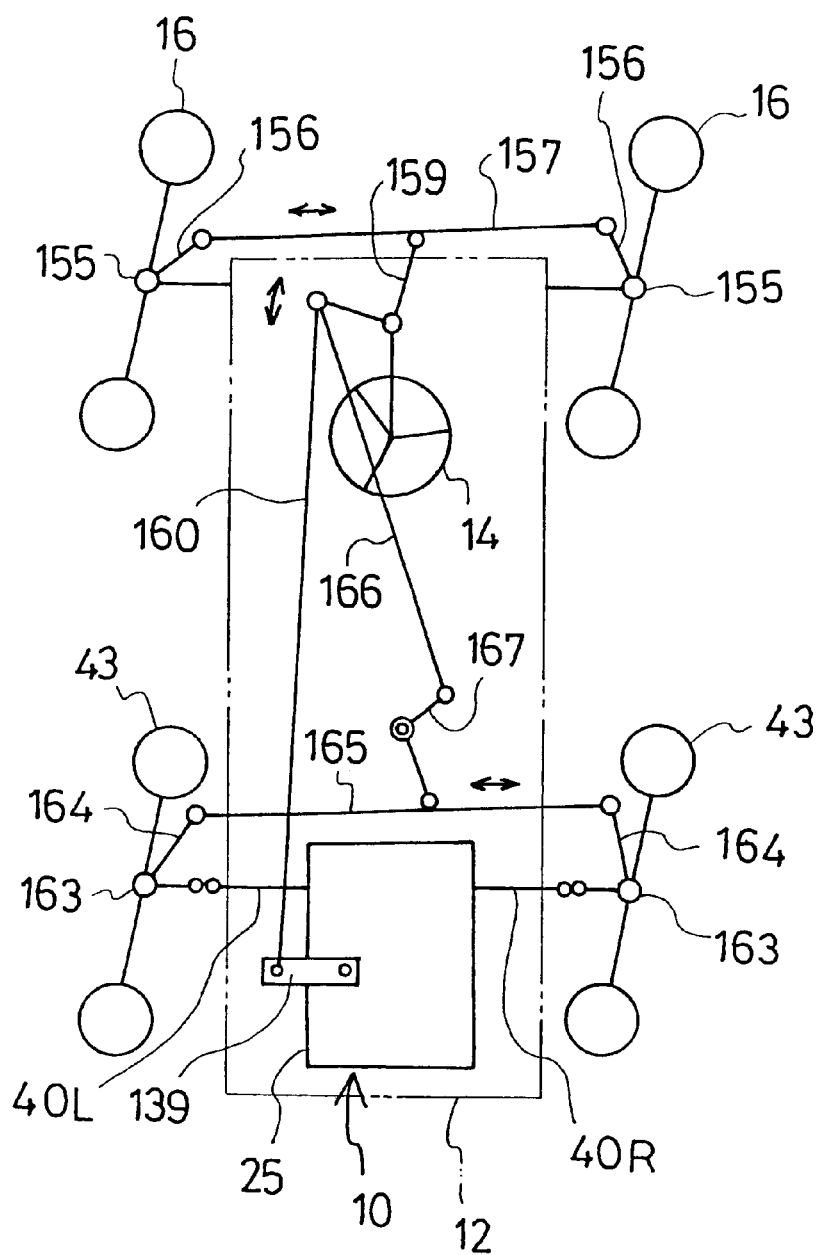
FIG. 5 is a schematic view of a third embodiment of the running vehicle of FIG. 3.
Figure 6:
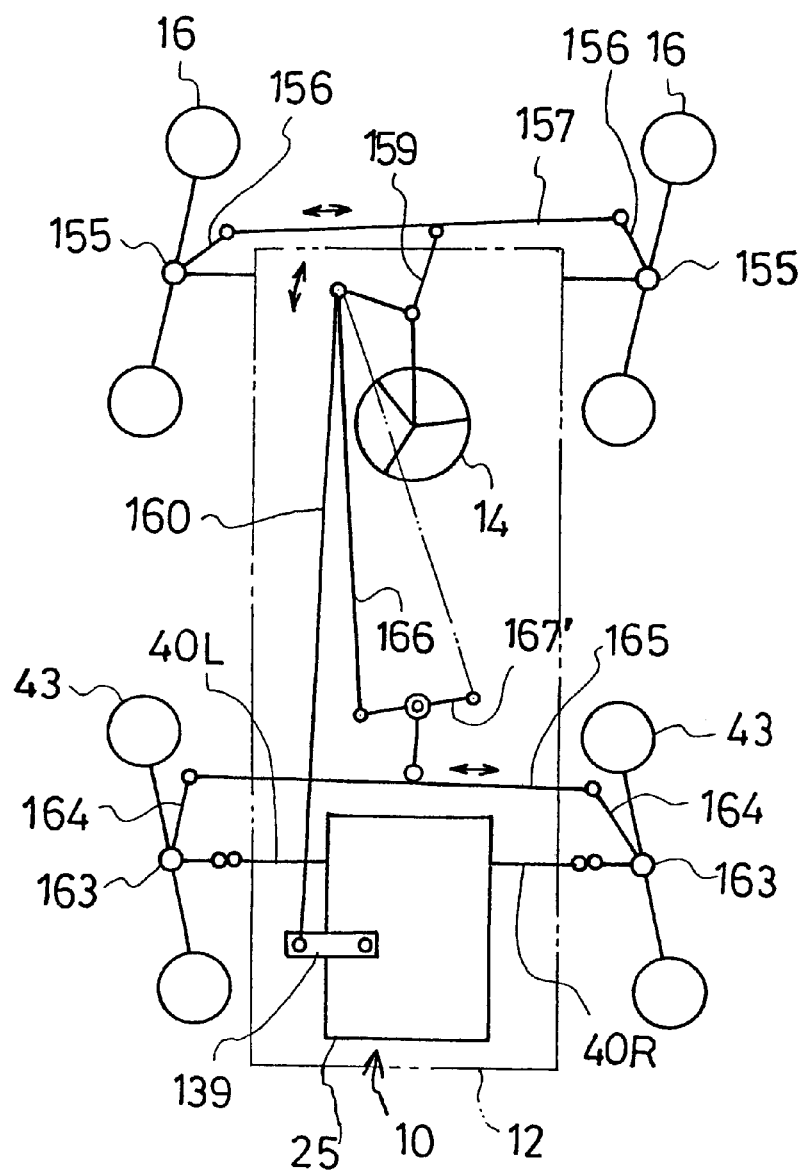
FIG. 6 is a schematic view of a fourth embodiment of the running vehicle of FIG. 3.

Referring to FIG. 6 showing a fourth embodiment of the present invention as a modification of the third embodiment shown in FIG. 5, a pivotal joint point between a T-liken shaped bell crank arm 167' and connection link 166 can be positionally changed so as to change a lateral turning direction of rear running wheels 43 with respect to the rotating direction of steering wheel 14, according to different running conditions. When the vehicle is to run fast or is to make a turn while keeping upright, connection link 166 is disposed along a phantom line shown in FIG. 6 to be connected to arm 167', thereby constituting a linkage which is similar with that consisting of connection link 166 and bell crank arm 167 of the third embodiment shown in FIG. 5, so that rear running wheels 43 are turned laterally in parallel to or in the same direction with turned front running wheels 16.

When the vehicle is to make U-turn, for example, while farming on a narrow field, connection link 166 is disposed along a full line shown in FIG. 6 to be connected to arm 167', so that rear running wheels 48 are turned laterally opposite to the lateral turning direction of front running wheels 16, whereby the vehicle can make a U-turn with a greatly reduced radius without a large rotational degree of steering wheel 14.

It should be noted that, in both the embodiments shown in FIGS. 5 and 6, the lateral turning angles of front and rear running wheels 16 and 43 are determined in correspondence to the difference between the rotary speeds of left and right running-driving axles 40L and 40R driven by axle driving/steering unit 10.

Also, running-driven axles 150L and 150R may be additionally provided so as to interlock with running-driving axles 40L and 40R through sprockets (pulleys) 152 and 153 and chains (belts) 154, as in the first or second embodiment. In this case, running-driven wheels 151 are drivingly connected with running-driven axles 150L and 150R and may be steerable so as to be steered by steering wheel 14.

Figure 7:
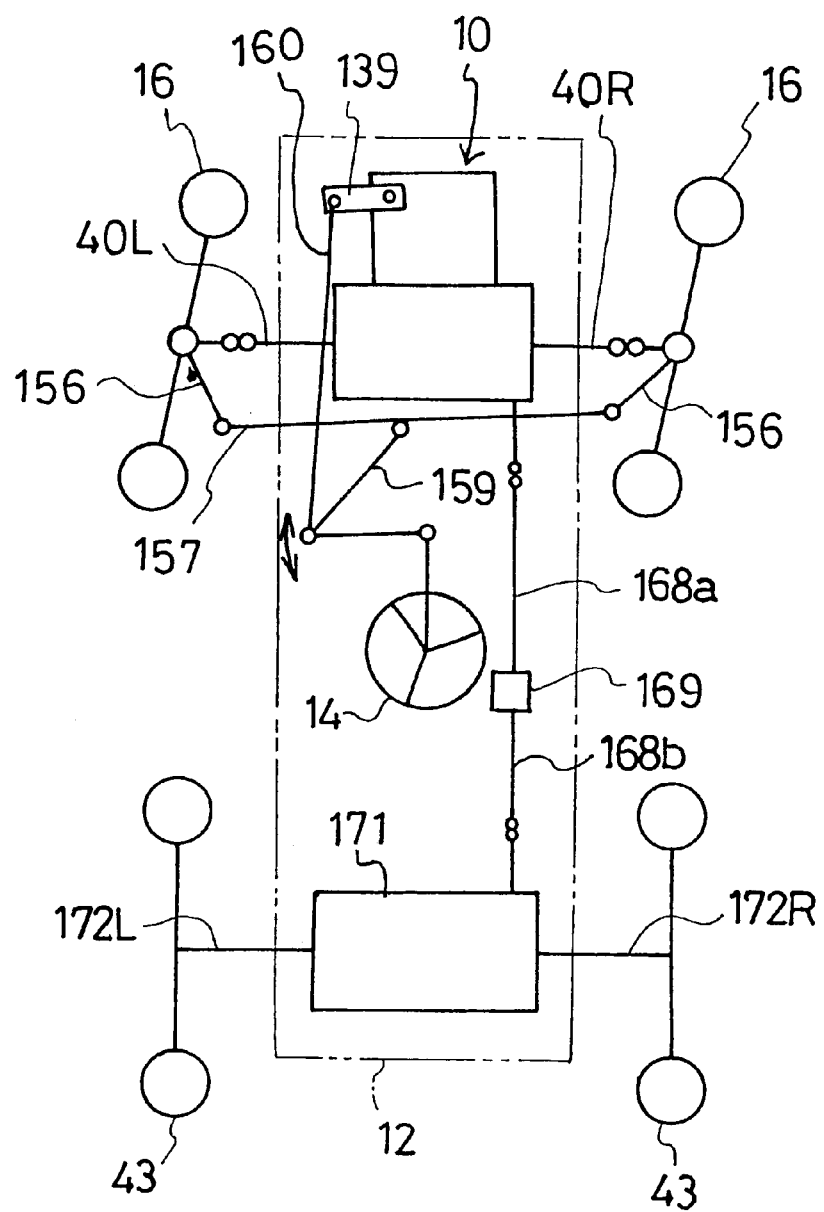
FIG. 7 is a schematic view of a fifth embodiment of the running vehicle of FIG. 3.

Next, an explanation will be given on a fifth embodiment of the running vehicle driven by axle driving/steering unit 10 in accordance with FIG. 7. Axle driving/steering unit 10 is disposed so as to drivingly connect its running-driving axles 40L and 40R with steerable front running wheels 16, which can be steered by manipulation of steering wheel 14, the same as the second, third and fourth embodiments. In this regard, tie rod 157 is interposed between left and right knuckle arms 156 with front running wheels 16, and steering wheel 14 is connected with tie rod 157 through pitman arm 159. Thus, front running wheels 16 serve as steerable running-driving wheels.

A rear differential unit 171 is disposed so as to differentially connect a pair of left and right running-driven axles 172L and 172R with each other. Onto the outer ends of running-driven axles 172L, and 172R are fixed rear running wheels 43. Between motor shaft 54 of main driving HST 21 and an input shaft of rear differential unit 171 are interposed transmission shafts 168a and 168b in series which are differentially connected with each other through a center differential unit 169, so as to drive rear running wheels 43. Steering wheel 14 is operatively connected with arm 139 for turning movable swash plate 76 of steering HST 22 through pitman arm 159 and connection link 160.

In such a construction, when steering wheel 14 is rotated, left and right front running wheels 16 are laterally turned conforming with a rotational angle of steering wheel 14 and simultaneously, they are given a difference of rotary speed therebetween through steering HST 22 driven by the rotational manipulation of steering wheel 14. Furthermore, rear running wheels 43 are driven substantially in synchronism with the driving of front wheels 16, thereby enabling the vehicle to travel steadily while exactly applying the driving force onto the ground without dragging rear running wheels 43.

Rear running wheels 43 may be steerably connected to running-driven axles 172L and 172R so as to be steered by manipulation of steering wheel 14.

Figure 8:
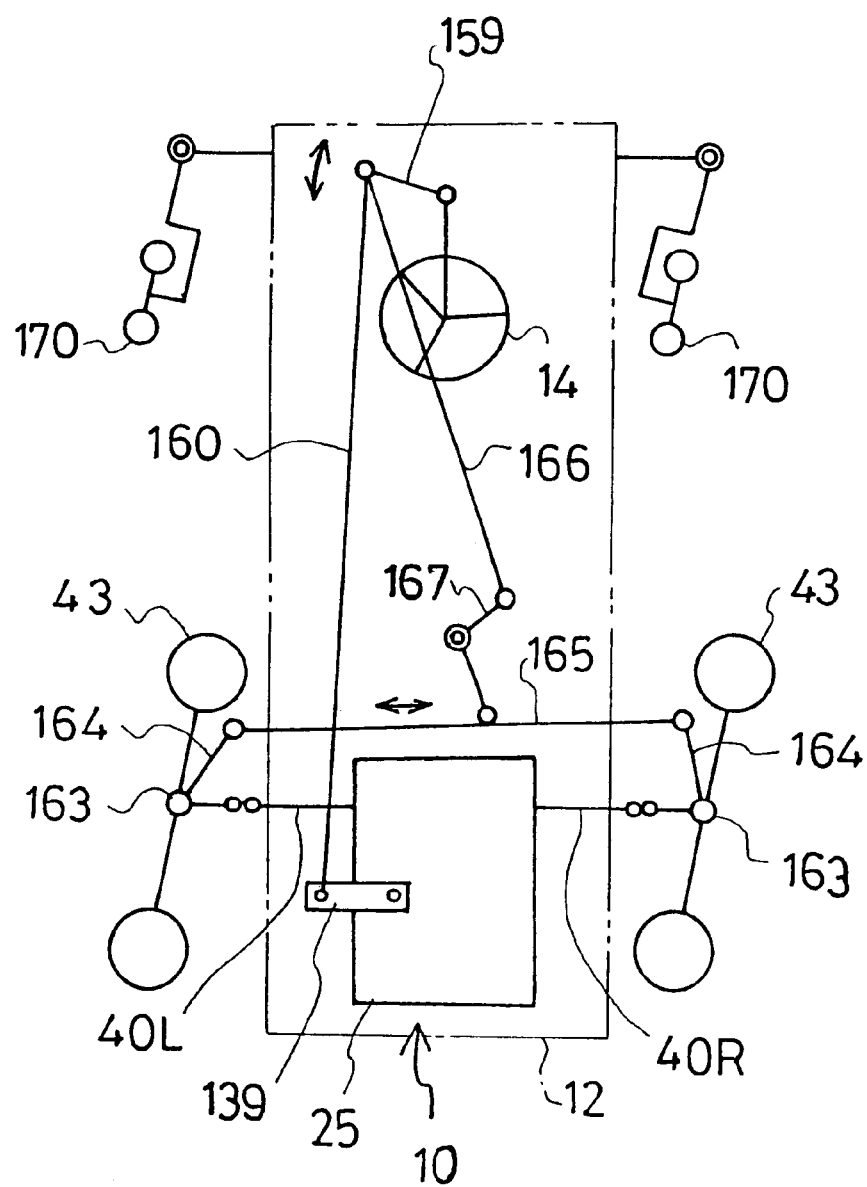
FIG. 8 is a schematic view of a sixth embodiment of the running vehicle of FIG. 3.

Next, an explanation will be given on a sixth embodiment of a running vehicle driven by axle driving/steering unit 10 in accordance with FIG. 8. As in the third embodiment shown in FIG. 5, rear running wheels 43, serving as running-driving wheels which are drivingly connected with running-driving axles 40L and 40R of axle driving/steering unit 10 so as to be made with a difference of rotary speed therebetween according to manipulation of steering wheel 14, also serve as steerable running wheels which are steered according to the same operation. The vehicle is provided with castor wheels 170 instead of front running wheels 16. In this embodiment, a pair of left and right castor wheels 170 are provided, however, the number thereof is not limited. Steering wheel 14 is connected through pitman arm 159 and connection link 160 with arm 139 so as to turn movable swash plate 76 of steering HST 22. Running-driven wheels 151 may be additionally provided and also may be steerable.

In such a construction, when steering wheel 14 is turned while running the vehicle, rear running wheels 43 are laterally turned conforming with the turning direction of steering wheel 14, and also are given a difference of rotary speed therebetween, thereby enabling the vehicle to turn in a further smaller turning radius, in which time castor wheels 170 follow the turning conforming with rear running wheels 43.

The above-mentioned construction of the vehicle according to the present invention is applicable to such a vehicle as a tractor, a riding mower, a snow removing vehicle and an amphibian motorcar.

Although several embodiments have been described, they are merely exemplary of the invention and not to be construed as limiting, the invention being defined solely by the appended claims.

What is claimed is:

1. A running vehicle comprising:
   a steering operation tool;
   a pair of running-driving axles;
   a first pair of running wheels drivingly connected with said pair of running-driving axles;
   a first differential unit interposed between said pair of running-driving axles;
   a first hydrostatic transmission for transmitting a driving force to said first differential unit;
   a pair of steering output shafts;
   a second differential unit interposed between said pair of steering output shafts;
   a second hydrostatic transmission for transmitting a driving force to said second differential unit, wherein said second hydrostatic transmission operationally interlocks with said steering operation tool so that the output speed and direction of said second hydraulic transmission is changed by manipulation of said steering operation tool;
   a first drive train interposed between one of said steering output shafts and one of said running-driving axles;
   a second drive train interposed between the other steering output shaft and the other running-driving axle for transmitting rotating effort to said other running-driving axle in the opposite direction to said first drive train;
   a pair of running-driven axles disposed in either front of or in rear of said pair of running-driving axles;
   a second pair of running wheels drivingly connected with said pair of running-driven axles;
   a pair of power transmission mechanisms, each of said power transmission mechanisms being interposed between said running-driving axles and said running-driven axles arranged on each side of said vehicle, so as to rotate said pair of running-driven axles in the same rotational direction as that of said running-driving axles;

a pair of steerable running wheels being steered by manipulation of said steering operation tool.

2. A running vehicle comprising:

a steering operation tool;

a pair of running-driving axles;

a first pair of steerable running wheels steered by manipulation of said steering operation tool, wherein said first pair of steerable running wheels are drivingly connected with said pair of running-driving axles;

a first differential unit interposed between said pair of running-driving axles;

a first hydrostatic transmission for transmitting a driving force to said first differential unit;

a pair of steering output shafts;

a second differential unit interposed between said pair of steering output shafts;

a second hydrostatic transmission for transmitting a driving force to said second differential unit, wherein said second hydrostatic transmission operationally interlocks with said steering operation tool so that the output speed and direction of said second hydraulic transmission is changed by manipulation of said steering operation tool;

a first drive train interposed between one of said steering output shafts and one of said running-driving axles; and a second drive train interposed between the other steering output shaft and the other running-driving axle for transmitting rotating effort to said other running-driving axle in the opposite direction to said first drive train.

3. A running vehicle as set forth in claim 2, further comprising:

a pair of running-driven axles disposed in either front of or in rear of said pair of running-driving axles, wherein said pair of running-driven axles are driven in synchronism with said pair of running-driving axles; and another pair of running wheels drivingly connected with said pair of running-driven axles.

4. A running vehicle as set forth in claim 3, further comprising:

a pair of power transmission mechanisms, each of said power transmission mechanisms being interposed between one of said running-driving axles and one of said running-driven axles arranged on each common side of said vehicle, so as to rotate said pair of running-driven axles in the same rotational direction of said pair of running-driving axles.

5. A running vehicle as set forth in claim 4, wherein said pair of running wheels drivingly, connected with said pair of running-driven axles are steerable so as to be steered by manipulation of said steering operation tool.

6. A running vehicle as set forth in claim 3, further comprising:

a third differential unit interposed between said pair of running-driven axles, wherein said third differential unit receives a driving force taken out from said first hydrostatic transmission.

7. A running vehicle as set forth in claim 6, wherein said pair of running wheels drivingly connected with said pair of running-driven axles are steerable so as to be steered by manipulation of said steering operation tool.

8. A running vehicle as set forth in claim 2, further comprising:

a pair of second steerable running wheels disposed in either front of or in rear of said pair of first steerable running wheels, said pair of second steerable running wheels being steered by manipulation of said steering operation tool.

9. A running vehicle as set forth in claim 8, wherein said first steerable running wheels are steered in the same steering direction with said second steerable running wheels steered by the the operation of said steering operation tool.

10. A running vehicle as set forth in claim 8, wherein said first steerable running wheels are steered in the opposite steering direction to said second steerable running wheels steered by the the operation of said steering operation tool.

11. A running vehicle as set forth in claim 8, wherein said first steerable running wheels are steered selectively either in the same steering direction with or in the opposite steering direction to said second steerable running wheels steered by the the operation of said steering operation tool.

12. A running vehicle as set forth in claim 8, further comprising:

a pair of running-driven axles disposed in either in front of or in rear of said pair of running-driving axles, wherein said pair of running-driven axles are driven in synchronism with said pair of running-driving axles; and another pair of running wheels drivingly connected with said pair of running-driven axles.

13. A running vehicle as set forth in claim 12, further comprising:

a pair of power transmission mechanisms, each of said power transmission mechanisms being interposed between one of said running-driving axles and one of said running-driven axles arranged on each common side of said vehicle, so as to rotate said pair of running-driven axles in the same rotational direction of said running-driving axles.

14. A running vehicle as set forth in claim 13, wherein said pair of running wheels drivingly connected with said pair of running-driven axles are steerable so as to be steered by manipulation of said steering operation tool.

15. A running vehicle as set forth in claim 12, further comprising:

a third differential unit interposed between said pair of running-driven axles, wherein said third differential unit receives a driving force taken out from said first hydrostatic transmission.

16. A running vehicle as set forth in claim 15, wherein said pair of running wheels drivingly connected with said pair of running-driven axles are steerable so as to be steered by manipulation of said steering operation tool.

17. A running vehicle as set forth in claim 2, further comprising:

at least one castor wheel disposed either in front of or in rear of said pair of first steerable running wheels.

18. A running vehicle as set forth in claim 17, further comprising:

a pair of running-driving axles disposed either in front of or in rear of said pair of running-driving axles, wherein said pair of running-driven axles are driven in synchronism with said pair of running-driving axles; and another pair of ruining wheels drivingly connected with said pair of running-driven axles.

19. A running vehicle as set forth in claim 18, further comprising:

a pair of power transmission mechanisms, each of said power transmission mechanisms being interposed between one of said running-driving axles and one of said running-driven axles arranged on each side of said vehicle, so as to rotate said pair of running-driven axles in the same rotational direction of said running-driving axles.

20. A running vehicle as set forth in claim 19, wherein said pair of running wheels drivingly connected with said pair of running-driven axles are steerable so as to be steered by manipulation of said steering operation tool.

21. A running vehicle as set forth in claim 18, further comprising:

a third differential unit interposed between said pair of running-driven axles, wherein said third differential unit receives a driving force taken out from said first hydrostatic transmission.

22. A running vehicle as set forth in claim 21, wherein said pair of running wheels drivingly connected with said pair of running-driven axles are steerable so as to be steered by manipulation of said steering operation tool.

23. A running vehicle comprising:

a steering operation tool;

a pair of running-driving axles;

a first pair of steerable running wheels steered by manipulation of said steering operation tool, wherein said first pair of steerable running wheels are drivingly connected with said pair of running-driving axles;

a first differential unit interposed between said pair of running-driving axles;

a first hydrostatic transmission for transmitting a driving force to said first differential unit;

a pair of steering output shafts;

a second differential unit interposed between said pair of steering output shafts;

a second hydrostatic transmission for transmitting a driving force to said second differential unit, wherein said second hydrostatic transmission operationally interlocks with said steering operation tool so that the output speed and direction of said second hydraulic transmission is changed by manipulation of said steering operation tool;

a first drive train interposed between one of said steering output shafts and one of said running-driving axles;

a second drive train interposed between the other steering output shaft and the other running-driving axle for transmitting rotating effort to said other running-driving axle in the opposite direction to said first drive train; and at least one second running wheel disposed either in front of or behind said pair of first steerable running wheels.

* * * * *